United States Patent [19]

DeGooyer et al.

[11] Patent Number: 5,310,770

[45] Date of Patent: May 10, 1994

[54] WATER REDUCIBLE EPOXY-AMINE ADDUCTS BASED ON THE DIGLYCIDYL ETHER OF CYCLOHEXANE DIMETHANOL

[75] Inventors: William J. DeGooyer, Jeffersontown, Ky.; George A. Roy, II, Georgetown, Ind.

[73] Assignee: Hi-Tek Polymers, Inc., Jeffersontown, Ky.

[21] Appl. No.: 998,835

[22] Filed: Dec. 30, 1992

[51] Int. Cl.⁵ .................. C08K 3/20; C08G 59/44; C08G 59/50; C08G 65/00

[52] U.S. Cl. .................. 523/414; 523/404; 528/122; 528/124; 528/407; 525/526; 564/453; 568/583; 252/182.26

[58] Field of Search ........... 523/404, 414; 528/407, 528/122, 124; 525/526; 568/583; 564/453

[56] References Cited

U.S. PATENT DOCUMENTS

| | | | |
|---|---|---|---|
| 3,929,716 | 12/1975 | Komoto et al. | 523/404 |
| 3,963,666 | 6/1976 | Schreiber et al. | 523/404 |
| 4,348,505 | 9/1982 | Di Benedetto et al. | 525/504 |
| 4,417,033 | 11/1983 | Bowditch | 525/481 |

*Primary Examiner*—Frederick Krass

[57] ABSTRACT

Water-reducible curing agents for epoxy resins are made from the diglycidyl ether of cyclohexane dimethanol and a diamine selected from the group consisting of meta-xylylene diamine, isophorone diamine, diaminocyclohexane and 1,3-bisaminomethyl cyclohexane.

6 Claims, No Drawings

WATER REDUCIBLE EPOXY-AMINE ADDUCTS BASED ON THE DIGLYCIDYL ETHER OF CYCLOHEXANE DIMETHANOL

BACKGROUND OF THE INVENTION

The field of art to which this invention is directed is epoxy-amine adducts useful as curing agents for epoxy resins.

Epoxy-amine adducts, i.e., the reaction products of amines with mono or polyepoxides, have been used as curing agents for epoxy resins for a great number of years. Such adducts have lower volatility than unadducted amines due to their higher molecular weight and therefore cause less environmental problems. By varying the amine and/or the epoxy moiety, curing agents can be made which provide a wide range of properties to cured epoxy resin systems.

In U.S. Pat. No. 2,643,239, epoxy-amine adducts of diepoxides and secondary amines are described.

Epoxy-amine adducts of polyamines and polyepoxides are described in U.S. Pat. Nos. 2,651,589 and 2,909,448.

Various types of epoxy-amine adducts are disclosed in U.S. Pat. Nos. 4,182,831; 4,182,833; 4,525,542; 4,539,347; and 4,608,405.

In recent years due to environmental concerns and governmental regulations, there have been increased efforts made to develop curable epoxy resin systems which contain a minimum of volatile organic compounds and which can be reduced with water.

Many of the known epoxy-amine adducts can be dissolved in water in combination with a water miscible co-solvent. However, they generally cannot be dissolved in water with no organic solvent being present unless they are salted with an acid. The use of organic cosolvents introduces volatile organic compounds into the system. The use of acids for salting reduces the resistance properties of the cured compositions.

There is a need for an epoxy-amine adduct which can be dissolved in water with a minimum of organic cosolvent and which does not need to be salted in order to be soluble in water.

SUMMARY OF THE INVENTION

This invention is directed to epoxy-amine adducts which are soluble in water and which are useful as curing agents for epoxy resin compositions.

The water-reducible curing agent for epoxy resins of this invention is an epoxy-amine adduct which is the reaction product of the diglycidyl ether of cyclohexane dimethanol and a diamine selected from the group consisting of meta-xylylene diamine, isophorone diamine, diaminocyclohexane and 1,3-bisaminomethyl cyclohexane. The adduct contains about 1 mole of diamine reacted with each epoxide equivalent of the diglycidyl ether.

DESCRIPTION OF THE INVENTION

The epoxy portion of the epoxy-amine adduct of this invention is the diglycidyl ether of cyclohexane dimethanol. The substituents on the cyclohexane ring are predominantly in the 1,4 position, i.e., about 95 to about 100 percent 1,4 with the remainder, if any, being 1,2. This diglycidyl ether is marketed by Rhone-Poulenc Specialty Resins Division under the trademark, Heloxy 107. The diglycidyl ether has an epoxide equivalent weight of 150-165, a viscosity at 25° C. of 55-75 cps, a weight per gallon of 9.0-9.2 pounds, and a Gardner Color of 1 maximum.

The amine portion of the epoxy-amine adduct of this invention is a primary diamine, the amine nitrogens of which are bonded to aliphatic or cycloaliphatic carbon atoms. The useful amines contain in their structure an aromatic ring or cycloaliphatic ring. These amines are meta-xylylene diamine, isophorone diamine, diaminocyclohexane, both 1,2 and 1,4, and 1,3-bisaminomethyl cyclohexane. The preferred amine for this invention is meta-xylylene diamine.

In preparing the adducts of this invention, the diglycidyl ether is reacted with an excess of the amine. The excess amine is used in order to suppress the formation of polymers and to form adducts which contain predominantly 2 moles of diamine for each mole of diglycidyl ether. The reaction is preferably conducted by slowly adding the diglycidyl ether to the amine and allowing the exothermic reaction to proceed. The temperature at which the reaction is conducted varies from room temperature to about 150° C., preferably about 90° C. to about 120° C. When the adducting reaction is completed, the excess unreacted amine is removed by heating under vacuum.

The amount of diamine used in the reaction is at least about 4 moles of diamine per each mole of diglycidyl ether, preferably about 5 moles of diamine to about 8 moles per mole of diglycidyl ether.

After removal of the unreacted amine, the epoxy-amine adduct can be dissolved in water without the use of a cosolvent or acid. When diluted with water to a solids contents of about 80 percent by weight, the solutions exhibit a Gardner-Holdt viscosity at 25° C. of about $Z_2$ to about $Z_7$.

The diglycidyl ether of cyclohexanedimethanol contains a small amount of bound chlorine due to the use of epichlorohydrin in its manufacture. During the adduct forming reaction, this bound chlorine is removed by an SN2 reaction with the amine, producing HCl which immediately salts with the adduct. When these adducts are used in coating compositions for metal, flash rust inhibitors, e.g. sodium nitrate, can be used in the formulations.

In a preferred variant of the invention, the HCl resulting from the SN2 reaction can be neutralized with sodium hydroxide to form sodium chloride which can be removed from the adduct by filtration or centrifugation before water is added to the adduct. When using this variant, no flash rust inhibitor is needed.

The epoxy-amine adducts of this invention are preferably used as curing agents for aqueous epoxy resin dispersions in the formulation of coatings for general industrial use. Most preferred coating compositions are those which are formulated to cure under ambient conditions and for use in industrial maintenance and marine coatings.

Aqueous epoxy resin dispersions are well known compositions which are exemplified in U.S. Pat. No. 4,315,044 which is hereby incorporated by reference. Such epoxy resin dispersions generally contain glycidyl polyethers of polyhydric phenols, e.g., epichlorohydrin—Bisphenol A reaction products, having epoxide equivalent weights from about 300 to about 5,000, preferably about 500 to about 1,000. The glycidyl polyethers of dihydric phenols are dispersed in water or a mixture of water and a water miscible cosolvent at a solids content of about 40 to about 70 percent by weight. The dispersions are made using a surfactant, preferably a nonionic surfactant.

In preparing coating compositions, the epoxy-amine adduct is blended with the epoxy resin dispersion in such amounts that about 0.5 to about 1.5 amine hydrogens are used for each epoxide group. Preferably about 0.9 to about 1.1 amine hydrogens per epoxide group are used.

The blends have a useful pot life of up to about 8 hours after blending. Coatings develop useful properties after overnight cure.

The coating compositions made with the adduct of this invention can be used as clear coatings, i.e., unpigmented, and can also be pigmented using any of the pigments which are used in paint manufacture, such as those disclosed in Kirk-Othmer "Encyclopedia of Chemical Technology," Second Edition, Vol. 15, pages 495-605.

Additional additives are flow modifiers which are well known to those skilled in the art.

Coupling solvents can also be used to increase the compatibility between the epoxy resin and the adduct and to enhance the film properties. Coupling solvents are water miscible organic liquids which are solvents for both the epoxy-amine adducts and the epoxy resins. Examples of useful cosolvents are ethyl diglyme, diacetone alcohol, propylene glycol monomethyl ether, ethylene glycol monopropyl ether, and the like.

Cure accelerators or promoters, such as t-butylphenol and 2,4,6-tri(dimethylaminomethyl) phenol, can also be used in amounts of about 0.5 to about 1.5 weight percent based on the solids content of the epoxy-amine adduct and the epoxy resin dispersion.

The invention is described in detail by the following examples. Parts and percentages unless otherwise indicated, are parts and percentages by weight.

EXAMPLE 1

To a suitable reactor were added 681 parts of metaxylylenediamine (MXDA). Nitrogen gas was introduced into the reactor, heat was applied and agitation was begun. When the temperature reached 102° C., slow addition of 308 parts of the diglycidyl ether of cyclohexanedimethanol having an epoxide equivalent weight of 154 was begun. The addition was completed within one hour while the temperature rose to 113° C. Agitation was continued for 1 hour while the temperature dropped to 90° C. The reactor was then equipped for vacuum distillation and heat was applied. When the temperature reached 211° C., vacuum was applied to distill off the excess unreacted MXDA. Distillation was continued until a pot temperature of 232° C. and full vacuum (14 torr) were obtained. Heating was discontinued, and when the temperature dropped to 184° C., vacuum was released. The resulting epoxy-amine adduct was then diluted with 145 parts of deionized water.

The product had a Gardner-Holdt viscosity at 25° C. of $Z_4$-$Z_5$, a solids content of 79.7 percent, a Gardner color of 2 and a titratable nitrogen of 9.03 percent based on solids.

EXAMPLE 2

To a suitable reactor were added 500 parts of the epoxy-amine adduct solution prepared as described in Example 1. Heating and agitation were begun and at 60° C., 20.4 parts of 50 percent aqueous NaOH solution were added. Heating was continued raising the temperature to 104° C. Vacuum was then applied to remove water while the temperature was raised to 110° C. Heating was discontinued and the vacuum was released. To the reactor were added 170 parts of propylene glycol monopropyl ether. When solution was obtained, the solution was filtered to remove sodium chloride and any residual sodium hydroxide. The filtered solution was then returned to the reactor and the propylene glycol monopropyl ether solvent was removed by vacuum distillation to a pot temperature of 166° C. To the epoxy-amine adduct were added 88 parts of water. The resulting solution had a Gardner-Holdt viscosity at 25° C. of $Z_6$-$Z_7$, a solids content of 80.5 percent, a Gardner color of 9 and a titratable nitrogen of 9.5 percent based on solids.

EXAMPLE 3

Using the same procedure described in Example 1, the diglycidyl ether of cyclohexane dimethanol (308 parts) was reacted with 851 parts of isophorone diamine. The resulting product after removal by vacuum distillation of the excess unreacted isophorone diamine and subsequent reduction with deionized water, had a Gardner-Holdt viscosity of $Z_5$-$Z_6$, a solids content of 74.7 percent, a Gardner color of 1, and a titratable nitrogen of 8.2 percent based on solids.

EXAMPLE 4

Using the same procedure described in Example 1, 308 parts of the diglycidyl ether of cyclohexane dimethanol were reacted with 571 parts of 1,2-diaminocyclohexane. The resulting product, after vacuum distillation of the excess unreacted amine and subsequent dilution with deionized water, had a Gardner-Holdt viscosity at 25° C. of $Z_5$, a solids content of 80.2 percent, a Gardner color of less than 1, and a titratable nitrogen of 9.6 percent based on solids.

EXAMPLE 5

Using the same procedure described in Example 1, 242 parts of the diglycidyl ether of cyclohexane dimethanol were reacted with 441 parts of 1,3-bisaminomethyl cyclohexane. After removal of the excess amine and treatment with NaOH following the procedure of Example 2, the resulting product in deionized water had a Gardner-Holdt viscosity of $Z_5$-$Z_6$ at 25° C., a solids content of 76.7 percent, a Gardner color of 5-6, and titratable nitrogen of 10.08 percent based on solids.

EXAMPLE 6

Coating compositions were prepared from the epoxy-amine adduct solutions described in the preceding examples and an aqueous epoxy resin dispersion, EPIREZ WJ3520, manufactured by the Specialty Resins Division of Rhone-Poulenc, Inc. The epoxy resin dispersion had a non-volatiles content of 55 percent, a viscosity at 25° C. of 12,000 cps, a solvent mixture of 82.9 percent water and 17.1 percent 2-propoxyethanol, and an epoxide equivalent weight of 525 based on solids. The epoxy resin dispersion was made using the procedure described in U.S. Pat. No. 4,315,044.

The coating compositions were formulated as shown in Table 1. In the Table, Adduct refers to the epoxy-amine adducts. Example 6-1 is made using the adduct of Example 1, Example 6-2, the adduct of Example 2, Example 6-3, the adduct of Example 3 and Example 6-4, the adduct of Example 4. ER Disp refers to the epoxy resin dispersion. PM refers to propylene glycol monomethyl ether. Sodium nitrate is a 1 percent solution in water.

After a one hour induction period, coatings from each of the formulations were drawn down on Bonderite 1000 steel panels. The coatings were then tested as follows:

Pencil hardness was determined on coatings left overnight at room temperature and after two weeks at room temperature.

Water, chemical and solvent resistance were determined on coatings left two weeks at room temperature. This test was conducted by placing a large drop of liquid on the coating, covering it with a watch glass, and reviewing the coating after 24 hours. Tests were conducted using deionized water (DI Water), 10 percent aqueous HCl, 10 percent aqueous acetic acid, 10 percent aqueous nitric acid, 10 percent aqueous sodium hydroxide and Skydrol.

Solvent resistance to methyl ethyl ketone (MEK) was measured by determining the number of double rubs with a cloth saturated with MEK needed to soften the coating to a pencil hardness of 6B or softer and also the number of double rubs to breach the coating.

The test results are shown in Table 2. In the table, NE means no effect; LNE means little to no effect; V.S. white means very slightly white; 8M, 6M and 4M refers to medium density blisters on a scale of 10 being a very small number to 1 being a large number.

TABLE 1

| | Coating Formulation | | | |
|---|---|---|---|---|
| Example | 6-1 | 6-2 | 6-3 | 6-4 |
| Components, parts | | | | |
| Adduct | 11.8 | 9.9 | 13.5 | 11.1 |
| ER Disp | 88.2 | 90.1 | 86.5 | 88.9 |
| Ethyl Diglyme | 5.0 | — | 5.0 | 5.0 |
| PM | — | 2 | — | — |
| Sodium nitrate | 0.38 | — | 0.38 | 0.38 |
| Fluoro carbon acid | 0.4 | — | 0.4 | 0.4 |
| Deionized H$_2$O | 8.6 | 8.1 | 7.8 | 8.1 |

TABLE 2

| | Evaluation of Coatings | | | |
|---|---|---|---|---|
| Example | 6-1 | 6-2 | 6-3 | 6-4 |
| Tests | | | | |
| Pencil Hardness | | | | |
| Overnight | HB | F | HB | 2B |
| 2 weeks | F | F | F | F |
| Water Resistance | | | | |
| DI Water | V.S. White | NE | V.S. White | LNE |
| Chemical Resistance | | | | |
| HCl | NE | NE | NE | NE |
| Acetic Acid | White, 4M | White, 6M | White, 6M | White, 8M |
| HNO$_3$ | V.S. White | NE | Dulls | NE |
| NaOH | LNE | NE | NE | NE |
| Solvent Resistance | | | | |
| Skydrol | Soft >6B | 5B | Destroyed | Destroyed |
| MEK >6B | 30–40 | 35 | 30–40 | 30–40 |
| MEK Breach | 930 | 605 | 300 | 300 |
| Impact Resistance Reverse | >160 | >160 | 150 | >160 |

What is claimed is:

1. A curing agent for epoxy resins which comprises a water solution of a 1:2 molar epoxy-amine adduct of the diglycidyl ether of cyclohexane dimethanol and a diamine selected from the group consisting of meta-xylylene diamine, isophorone diamine, diaminocyclohexane and 1,3-bisaminomethyl cyclohexane, wherein said water solution includes essentially no cosolvent.

2. The curing agent of claim 1 wherein the diamine is meta-xylylene diamine.

3. The curing agent of claim 1 in which the diglycidyl ether of cyclohexane dimethanol has an epoxide equivalent weight within the range of 150 to 165.

4. A process for preparing a curing agent for epoxy resins which comprises
   (a) reacting the diglycidyl ether of cyclohexane dimethanol with a molar excess of a diamine selected from the group consisting of meta-xylylene diamine, isophorone diamine, diaminocyclohexane and 1,3-bisaminomethyl cyclohexane to form a 1:2 epoxy-amine adduct,
   (b) removing any unreacted diamine, and
   (c) adding water to dissolve said epoxy-amine adduct thereby forming a water solution of said adduct which includes essentially no cosolvent.

5. The process of claim 4 wherein at least four moles of the diamine are used per mole of the diglycidyl ether.

6. The process of claim 4 wherein the diamine is meta-xylylene diamine.

* * * * *